Jan. 13, 1925.
F. B. KING
CHAIN HOOK
Filed May 22, 1924
1,522,889
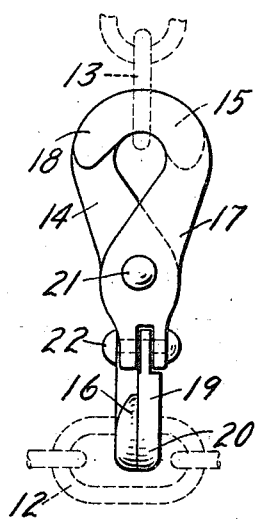
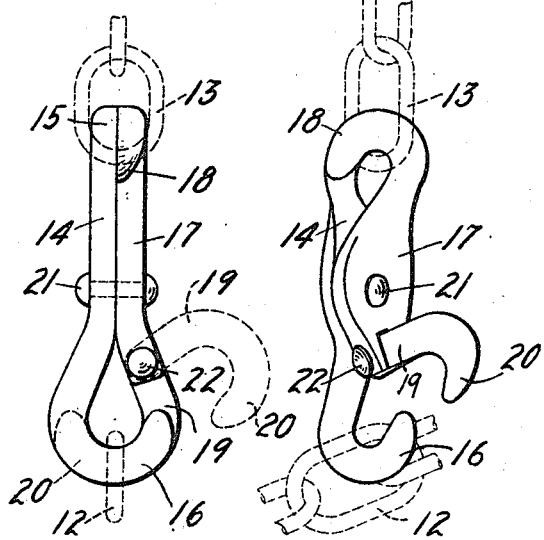
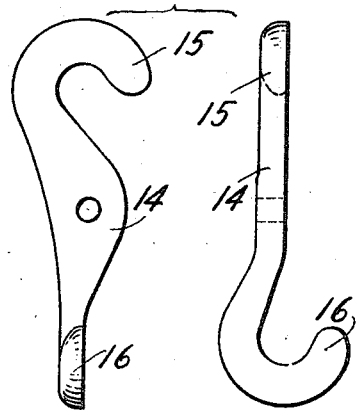
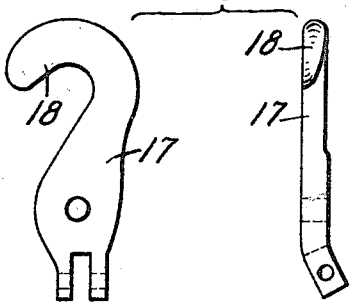
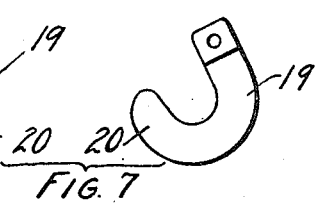
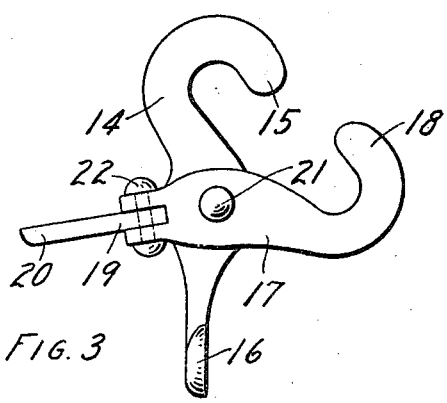
INVENTOR
F. B. KING
ATT'YS Patented Jan. 13, 1925.

1,522,889

UNITED STATES PATENT OFFICE.

FRANK B. KING, OF WAKEFIELD, MASSACHUSETTS.

CHAIN HOOK.

Application filed May 22, 1924. Serial No. 715,069.

*To all whom it may concern:*

Be it known that I, FRANK B. KING, a citizen of the United States, residing at Wakefield, in the county of Middlesex and State of Massachusetts, have invented new and useful Improvements in Chain Hooks, of which the following is a specification.

The object of this invention is to provide a device adapted for use in connecting an anti-skid chain which extends across the tread of a motor vehicle wheel, with the anchoring chains which bear on opposite sides of the rim of the wheel and extend around the same.

The invention is an improvement on the device disclosed by my application filed May 22, 1923, Serial No. 640,642, and is embodied in the improved construction hereinafter described and claimed.

Of the accompanying drawings forming a part of this specification,—

Figures 1 and 2 are side views, taken from different points, showing a securing device embodying the invention, engaged with a link of an anti-skid chain, and with a link of an anchoring chain, said device including an inflexible member and a flexible or jointed member.

Figure 3 is a view similar to Figure 1, showing the parts of the divisible eyes hereinafter described, separated from each other preparatory to engagement with the chain links.

Figure 4 is a perspective view, showing one of the divisible eyes closed and the other open.

Figure 5 shows by separate views, the inflexible elongated member.

Figure 6 shows by separate views, the major portion of the jointed member.

Figure 7 shows by separate views, the minor portion of the jointed member.

The same reference characters indicate the same parts in all of the figures.

In the drawings, 12 represents a portion of a continuous anchoring chain, which may be understood to be one of two chains located at opposite sides of the rim of a rubber-tired motor-vehicle wheel, each chain being continuous and forming a circle corresponding to the rim, so that any desired member of anti-skid chains 13 extending across the tread of the tire may be connected with the anchoring chains.

It will be understood that each anti-skid chain is of a length sufficient to enable it to extend from one side of the wheel rim, across the tire tread and to the opposite side of the wheel rim.

The securing device in which my invention is embodied is designed to connect the end portions of an anti-skid chain 13, with corresponding portions of the anchoring chains 12, there being two of these devices for each anti-skid chain 13, the devices being detachably engaged with the end links of the chain, and with suitable links of the anchoring chains 12.

My improved securing device comprises an inflexible one-piece elongated member 14, having end portions 15 and 16, forming open hooks, a jointed two-piece elongated member composed of a major portion 17, having an end portion 18, forming an open hook, and a minor portion 19, having an end portion 20, forming an open hook, a primary hinge pintle 21, connecting the member 14 with the major portion 17, and a secondary hinge pintle 22, connecting the portions 17 and 19 of the jointed member. The hooks of said members are formed to constitute two divisible eyes, arranged in planes substantially at right angles with each other, and adapted to respectively engage a link 13 of an anti-skid chain and a link 12 of an anchoring chain. The parts of the divisible eye formed by the hooks 15 and 18 are separable, as shown by Figure 3, by turning movements of the members on the primary pintle 21, to permit the engagement of said eye with a link 13, the minor portion 19 of the jointed member being first displaced, as shown by Figure 4, and by dotted lines in Figure 2, to permit its hook 20 to swing across the hook 16. When the eye formed by the hooks 15 and 18 is closed on a link 13, the eye formed by the hooks 16 and 20 is closed upon a link 12, by a turning movement of the minor portion 19, on the secondary pintle 22. The arrangement is such that the divisible eyes are held closed on the chain links by the tension of the chains.

The pintles 21 and 22 are inseparably engaged with the parts connected thereby, said pintles being preferably rivets headed at opposite ends. The elongated members of the improved securing device are, therefore, inseparable from each other, there being no coupling member detachably connecting said elongated members, as in the device disclosed by my above-mentioned application.

I claim:

A securing device for anti-skid chains comprising an inflexible one piece elongated member, a jointed two-piece elongated member including a major portion and a minor portion, a primary hinge pintle connecting the inflexible member with the said major portion, and a secondary hinge pintle connecting the said major and minor portions, the ends of said elongated members being formed to constitute two divisible eyes arranged in planes substantially at right angles to each other, and adapted to respectively engage a link of an anti-skid chain and a link of an anchoring chain, the parts of one divisible eye being separable by turning movements of said members on the primary pintle, to permit the engagement of said eye with a link on one of the chains, and the parts of the other divisible eye being separable by a turning movement of said minor portion on the secondary pintle, to permit the engagement of the last-mentioned eye with a link of the other chain, the arrangement being such that the said eyes are held closed by the tension of the chains.

In testimony whereof I have affixed my signature.

FRANK B. KING.